Aug. 1, 1967 D. J. VEAL 3,334,233
INTERNAL STANDARDS UNIFORMLY DISPERSED IN THE WALLS OF A
CONTAINER FOR ACTIVATION ANALYSIS
Filed Oct. 31, 1963
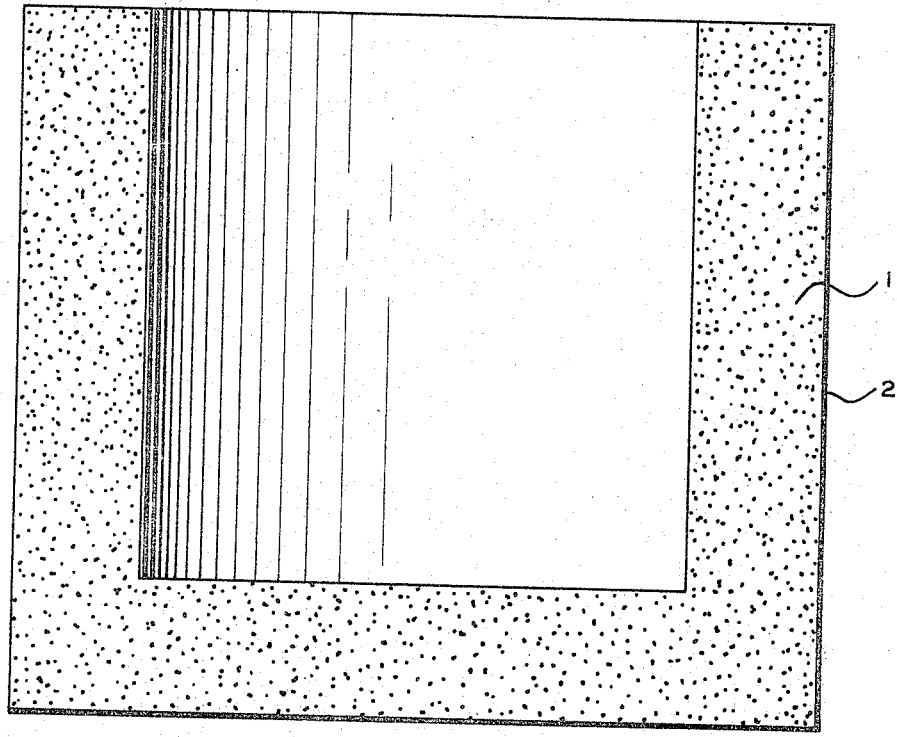
INVENTOR
D.J. VEAL
BY
ATTORNEYS

United States Patent Office 3,334,233
Patented Aug. 1, 1967

3,334,233
INTERNAL STANDARDS UNIFORMLY DISPERSED IN THE WALLS OF A CONTAINER FOR ACTIVATION ANALYSIS
Dean J. Veal, Bartlesville, Okla., assignor to Phillips Petroleum Company, a corporation of Delaware
Filed Oct. 31, 1963, Ser. No. 320,537
5 Claims. (Cl. 250—106)

This invention relates to activation analysis. In one aspect the invention relates to internal standards for activation analysis.

The use of nuclear methods and techniques in elemental analysis is increasing its industrial applications. These methods and techniques, collectively referred to as activation analysis, offer possibilities for fast quantitative determinations of many naturally occurring elements. Activation analysis not only supplements conventional analytical techniques in valuable ways but also affords analyses which would otherwise be impossible or impractical to do.

Activation analysis may be defined as a method for determining concentrations of constituents in a sample by measuring the characteristic radiations emitted by the radioactive nuclides which result from selected nuclear transformations. Activation analysis, in the broad sense, is excitation of an atom to a higher energy state and subsequent measurement of the energy which is emitted. Radioactivation analysis is generally used to designate the use of neutrons, charged particles or gamma rays. Activation analysis is capable of determining the amount of at least one constituent in the substance being analyzed which can be an element, a radical, or even a compound depending upon the type of radiation employed. Practically, radioactivation analysis is a two-step operation. First, the sample is exposed to an activating flux of radiation for a period of time long enough to form a measurable amount of artifically radioactive atoms. Second, the induced radioactivity is measured by electronic counting techniques.

Clearly the accuracy of the results depends to a great extent upon the net counting technique which in turn depends upon information concerning the decay scheme for the radioactive nuclide measured. Good accuracy in the analysis of unknowns can be realized by a procedure involving comparative measurements with samples of known composition. These standard samples, which should be of the same general composition as the unknown, are subjected to irradiation in an arrangement identical with that for the unknowns and, if possible, at the same time. As in radioisotope tracer methodology, the known and unknown samples are mounted so as to be as nearly alike as possible with respect to backing and sample spread. The counting rate should be measured with the standard in the same position with respect to the detector as the unknown. A comparison of the two counting rates, corrected to the same time of decay, is important in making possible an estimate of the weight of unknown as follows:

$$\frac{\text{Total activity from element X in unknown}}{\text{Total activity from element X in standard}} = \frac{\text{Mass of X in unknown}}{\text{Mass of X in standard}}$$

If a number of samples containing varying amounts of unknown are to be dealt with on a routine basis, it may be desirable to construct a calibration curve using a series of internal standards. Frequently, however, one properly chosen standard sample will be sufficient for the conduct of a given analysis.

It is an object of the invention to provide an improved method for activation analysis.

Yet another object of the invention is to provide an improved internal standard for activation analysis.

Still another object of the invention is to provide an improved container for activation analysis.

These and other objects of the invention will be readily apparent to those skilled in the art from the accompanying disclosure and appended claims.

It has now been found that instrumental activation analyses may be carried out through the use of an internal standard uniformly dispersed in the walls of a sample holder. The drawing shows internal standard 1 uniformly dispersed in the walls of sample holder 2. Thus, a large number of sample holders containing a desired known amount of the internal standard may be fabricated from a single batch of material with which the internal standard has been previously mixed. When many analyses are to be carried out, this permits a great saving in time over the usual method of weighing and uniformly dispersing the internal standard in each sample. Furthermore, in contrast with the usual method, the proposed technique does not result in contamination of the sample with the internal standard, thus permitting use of the same sample for subsequent determinations. By incorporation of the internal standard in the container the measurement of the extent of interaction of the energy of the internal standard makes it possible to determine the integrated flux to which the sample was exposed.

The material of construction into which the internal standard is incorporated and from which the sample holder is subsequently fabricated depends upon the analysis for which it is designed. It is essential, however, that this fabricated material be moldable into a solid form and that it be relatively transparent to the radiation employed. For example, thermoplastic organic polymers, especially polymers of 1-olefins such as polyethylene and polypropylene, are particularly suitable for activation analysis with neutrons, charged particles, or gamma rays. In general the major elements of construction are preferably carbon and hydrogen; other elements may be included if they do not interfere with the analysis. Oxygen and nitrogen may be present with thermal neutrons or gamma rays; only traces may be present with fast neutrons. For infrared spectrophotometry the sample holder may be made of an inorganic salt, such as potassium bromide, sodium chloride, or lithium fluoride. Ordinarily optically clear glass is satisfactory for analysis with visible light, and quartz may be employed for ultraviolet and X-ray analysis.

The invention is broadly applicable to activation analysis employing internal standards.

Several kinds of activation analysis have been proposed, differing mainly in the type of activating flux. The more common methods of activation include: Use of thermal or slow neutrons; fast neutrons; charged particles; photoexcitation; infrared, visible, and ultraviolet light; and X-rays. The invention is especially useful in activation analysis employing fast neutrons, thermal neutrons and/or gamma rays.

Historically, slow neutron activation analysis has accounted for well over 90 percent of the methods of radioactivation analysis used. This is due in part to the relatively high thermal neutron fluxes available in nuclear reactors. The sensitivity of radioactivation analysis methods is directly proportional to the magnitude of the available flux. With the fluxes available in nuclear reactors ($10^{12}$ to $10^{15}$ neutrons per square centimeter per second) sensitivities as low as $10^{-12}$ gram have been reported for some elements. Thermal neutrons are not made directly by nuclear reactions. They are obtained by moderating or thermalizing intermediate or fast neutrons to thermal energies (average of 0.025 electron volt) with multiple collisions with hydrogen or other light nuclei. The thermal neutron flux of a reactor is obtained by moderating the intermediate and fast neutrons emitted during the fission or other process through successive collision with the reactor moderating material, usually light or heavy water, carbon and the like. Thermal neutron fluxes are also obtained from particle accelerators. The nuclear reactions most commonly used include thermalization of the neutrons from the $Be^9(d,n)B^{10}$ reaction using a 2 to 5 mev. Van de Graaf accelerator, the thermalization of photoneutrons produced by the $Be^9$ $(\gamma,n)He^4$ reaction using the brehsstrahlung beam from an electron accelerator capable of accelerating the electrons to more than 3 mev. and the thermalization of the 14.5 mev. neutrons from the reaction obtained with a positive-ion accelerator. In general only one nuclear reaction takes place with thermal neutrons. This is generally the $(n,\gamma)$ reaction where the neutron is absorbed by the nucleus and the excess energy is emitted as electromagnetic radiation. This gives a new nuclide having the same atomic number as the original atom but one mass unit heavier.

Another type of activation is fast neutron activation employing fast neutrons having energies much higher than thermal neutrons. In general the nuclear reactions responsible for the production of fast neutrons give energies varying from 1 or 2 mev. up to 20 mev. Several different nuclear reactions are used routinely to produce fast neutrons including nuclear reactors and particle accelerators. The photoneutron production of neutrons is characterized by relatively high threshold energies and polyenergetic neutron yields. The higher neutron fluxes are obtained using a brehsstrahlung beam from an electron accelerator. Isotopic thermal resources can be used for relatively weak neutron fluxes. Monoenergetic neutrons are generally preferable for purposes of fast neutron activation analysis. This usually increases the sensitivities and reduces possible error caused by varying neutron environment due to different sample compositions, changes in reactor or accelerator operations, etc. Thus fast neutron activations are not characterized by single reactions as is the $(n,\gamma)$ reaction with thermal neutrons. Fast neutron activation usually occurs by three main reactions, the $(n,p)$, $(n,\gamma)$, and $(n,2n)$ reactions giving product nuclides of different elements and isotopes.

In general, the nuclear parameters of the reaction product nuclides will be different so that differentiation of each separate reaction is possible. Either the half-lives will be markedly different or the radiations emitted in the radioactive decay of the nuclide will differ as to their major radiation (gamma radiation, beta radiation, etc.) or to their energies. In these activations only one or possibly two of the possible nuclear reactions will have such readily favorable conditions such as high natural abundance of the parent isotope, high reaction cross section and an easily detected product isotope that their reaction can be adapted very readily to activation analysis.

Another type of activation is charged particle activation. The use of charged particle activation using the low energy accelerators usually available industrially is limited primarily to analysis of surface layers of a sample since positively charged ions interact strongly with matter and are stopped within a few millimeters of sample depth. These techniques are severely limited industrially outside of Government installations because of the lack of ready availability of high energy accelerators. Both thermal and fast neutron activation analysis have the advantage of analyzing the entire sample, not just the surface layers. In addition, the sample preparation is simple and adaptable to solids, liquids and volatile materials. No thermal damage is inflicted on the sample.

Another type of activation is photoexcitation activation. Relatively long-lived excited nuclear energy levels of normally stable isotopes are known for at least thirty elements. Several of these isotopic states have half-lives between a few seconds and a few hours or days and can be used for activation analysis. High energy particles or radiation are used to excite the stable nucleus to the "long-lived" excited state. Industrial gamma radiation from the brehsstrahlung flux of an electron accelerator has been used to excite these elements. Particle excitation requires high energy particles, obtainable from cyclotrons, betatrons, etc., and are usually not readily available for routine industrial applications. The product nuclide from photoexcitation activation is an excited state of the same starting nuclide. These isomeric states decay to the ground state of the isotope with a characteristic gamma ray. This method is highly specific for the few elements where it is applicable.

The detection and quantitative measurement of the radiations from the artificially radioactive atoms is the second major step in radioactivation analysis. Historically, using samples which had been activated with thermal neutrons in a reactor, the desired product nuclide was chemically separated from the bulk of the material before the radiations were quantitatively detected. In most analyses, beta particles were counted in conventional Geiger-Muller systems. Later, with the development of scintillation crystals, gamma radiation was also counted.

Beta radiation is emitted with a spectrum of energies up to some maximum energy. The desired beta activity will oftentimes be an insignificant fraction of the total beta spectrum, particularly when one looks for trace elements in the presence of macro amounts of other constituents. Therefore, it is usually necessary to chemically separate the desired nuclide from the mass of the irradiated material before quantitatively determining it beta radiation. Gamma radiation is emitted in discrete energies and is generally not as easily absorbed by materials as beta radiation. It is therefore possible to electronically separate the gamma rays according to their energies and quantitatively determine the amount of one gamma ray in the presence of others. Scintillation spectrometer systems, consisting of a gamma ray detector and multi-channel gamma radiation analyzer, record the total gamma spectrum from a sample. Inspection of this spectrum often gives a qualitative analysis of the sample at the same time that quantitative data are being accumulated. The self-absorption and various scattering errors inherent to beta radiation detection are usually very much smaller when counting gamma radiation. If the gamma ray spectrum is not too complex, accurate analyses can be made without a chemical separation of the desired activity. Since the half-lives of the radioactive nuclides will usually be quite different, the complexity of the spectrum can sometimes be reduced and the interpretation simplified by recording the gamma spectrum as a function of time.

The substance used as the internal standard depends upon the means of analysis and the material determined. For example, radioactivation analysis with a variety of internal standards may be employed, the choice being greatly influenced by the half-lives desired for the activated nucleus. Thus, indium is especially suitable for photoexcitation with gamma rays and tungsten may be used in activation by either gamma rays or fast neutrons. Manganese may be employed in activation by thermal neutrons. Silver is very satisfactory for use in activation by fast or slow neutrons or by gamma rays. The metal may be introduced as the element, or it may be incorporated in chemical combination with other elements. The internal standard to be used in analyses made by infrared, visible, ultraviolet, or X-ray spectrophotometry can be any of a large number of substances and is dependent upon both the method of analysis and the material being determined. The concentration of internal standard in the material of construction may vary over wide limits; however, the concentration is preferably such as to produce an effect the magnitude of which is comparable to that produced by the substance being determined.

It is generally possible to employ more than one internal standard in each bottle but it is preferable to make separate runs with a single internal standard in each bottle.

It is also within the scope of the invention to incorporate the internal standard in a form other than a bottle; for example, a sleeve may be used which is inserted into the bottle. However, the sleeve is, while operable, less convenient. In addition, a pellet can be employed; however, it is essential that the sample and standard should, as nearly as possible, occupy the same spot at the same time while being subjected to the radiation. In general the samples are oriented the same as the containers during radiation and during counting. It is frequently desirable to rotate the bottle containing the sample; however, this is generally necessary only when the radiation emanates from a single point.

The internal standards incorporated in the bottles of this invention are any of the solid internal standards normally employed for activation analysis. The bottle may be fabricated by the usual methods such as molding with the internal standard preferably being uniformly dispersed therein. The amount of the internal standard incorporated in the bottle is such that the portion of the bottle exposed to the flux contains about the amount of the internal standard conventionally included in the sample. For example, with a polyethylene bottle about 0.01 to 10.0 weight percent of the internal standard is uniformly dispersed in the bottle.

Although it is possible to reuse the bottles containing the internal standards over and over again, it is generally preferred that a fresh bottle be used.

The sample and the internal standard preferably are not the same material.

EXAMPLE I

The desired internal standard for use in radioactivation analysis was added to polyethylene pellets with uniform dispersion being achieved by Banbury mixing. A number of different internal standards were used at different concentrations. The uniform dispersion was fabricated by machine-molding into standard four-ounce bottles. Thus a large number of sample holders were made from each batch of resin containing the internal standard in known and uniform concentration. Uniformity was demonstrated in the bottles containing elemental silver; variations from bottle to bottle did not exceed two percent. The levels of concentration of the internal standard were chosen such that the range of activity produced an activation of the internal standard which would approximate the activity resulting from activation of the sample being analyzed.

The results are shown in the following table:

EXAMPLE II

*The determination of vanadium in crude oil with strontium as an internal standard by thermal neutron activation*

Procedure.—(1) The sample to be analyzed for vanadium was weighed into a tared oblong polyethylene bottle containing 2.5 percent strontium in the form of $SrCO_3$.

(2) The sample on the rack attached to the beryllium target was placed in an upright position flat against the target. The 3-inch diameter barrel surrounding the target was filled with water to act as moderator for the 6 mev. neutrons which were slowed to thermal velocities (0.025 ev.). The sample was bombarded for 10 minutes with thermal neutrons, removed from the target and placed in the detector. Exactly 1 minute after bombardment the count of the emitted gamma rays was begun and continued for exactly 8 minutes. The gamma rays were detected by a pair of 3-inch diameter by 3-inch thick sodium iodide crystals on each side of the sample. Gamma rays entering the NaI which was activated with thallium produced flashes of light which were proportional in intensity to the energy of the gamma rays. Each NaI crystal was optically coupled to electron multiplier phototubes which converted each flash of light to an electrical impulse and amplified it to a voltage sufficiently high to operate counting equipment. The counting equipment used was a 400-channel gamma ray spectroanalyzer which determined the energy of each emitted electrical pulse and stored each incremental pulse of equal energy as one "count." At the end of the counting period a spectrum was displayed of the number of counts vs. the energy of the gamma ray.

(3) The gamma ray spectrum of the sample was "read-out" in digital form onto an adding machine tape.

(4) From previous calibration the "peaks" of strontium (the neutron monitor) and of vanadium were located and the integrated area of each peak was determined.

(5) The procedure 1–4 was repeated for a known standard sample of vanadium containing a known amount of vanadium expressed in micrograms ($\gamma$).

(6) From this information it was then possible to calculate the amount of vanadium in the unknown sample ($x$) without knowing the neutron flux, assuming only that the geometries of sample and standard were the same during bombardment and counting:

$Sr_x$=integrated area of the strontium peak in the sample (expressed as counts).

TABLE I

| Run No. | Internal Standard | | Type Radiation Used | Analysis | | Dispersing Medium |
|---|---|---|---|---|---|---|
| | Element or Compound | Concentration, percent | | Element Determined | Concentration | |
| 1 | Ag | 0.1 | Thermal neutrons | V | 433 p.p.m. | Crude oil. |
| 2 | Ag | 0.1 | ----do---- | Na | 302 p.p.m. | Water. |
| 3 | Ag | 0.1 | ----do---- | Na | 250 p.p.m. | Crude oil. |
| 4 | Ag | 0.1 | ----do---- | Cl | 472 p.p.m. | Water. |
| 5 | Ag | 0.1 | ----do---- | Cl | 100 p.p.m. | Crude oil. |
| 6 | Ag | 1 | Gamma rays | Se | 26% | Solid residue from uranium processing. |
| 7 | Ag | 0.1 | 14 mev. neutrons | A | 1% | Air. |
| 8 | $SrCO_3$ | 2.4 | Thermal neutrons | V | 8.3 p.p.m. | Crude oil. |
| 9 | $SrCO_3$ | 2.4 | ----do---- | As | 1.5 p.p.m. | Do. |
| 10 | Mn | 0.1 | ----do---- | Pt | 0.1% | Dilute HCl. |
| 11 | $BaCO_3$ | 0.14 | ----do---- | A | 1% | Air. |
| 12 | Mo | 0.5 | ----do---- | A | 1% | Air. |
| 13 | Ag | 0.1 | ----do---- | Al | 30 p.p.m. | Crude oil. |
| 14 | Ag | 0.1 | ----do---- | Al | 11 p.p.m. | Water. |

$V_x$ = integrated area of the vanadium peak in the sample.
$W_x$ = weight of the sample in grams.
$Sr_s$ = integrated area of the strontium peak in the standard.
$V_s$ = integrated area of the vanadium peak in the standard.
$\gamma_s$ = micrograms of vanadium in the standard.

Vanadium in sample (p.p.m.)

$$= \left(\frac{V_x}{Sr_x}\right)\left[\frac{(\gamma s)(Sr_s)}{V_s}\right]\left(\frac{1}{W_x}\right)$$
$$= \left(\frac{29,346}{5,252}\right)\left[\frac{(147.5)(5106)}{1864}\right]\left(\frac{1}{26.09}\right) = 87 \text{ p.p.m}$$

Thus by having a constant amount of strontium uniformly distributed in each bottle determinations can be made without measuring the absolute flux.

Likewise multiple elemental determinations are possible on the same sample. If, for example, it had been desired, aluminum could have been determined on this same sample. It would have, of course, been necessary to run an aluminum standard. However, once the standards have been run, the value in the central brackets [ ] remains constant over long periods of time until some operating parameter changes, and many determinations can be made without rerunning a standard and determining the response or sensitively ($\gamma$/ratio).

EXAMPLE III

The vanadium content of 3 different crude oils was determined by fast neutron, X-ray and thermal neutron activation analysis and compared to results obtained by chemical analysis. The crude oils were chosen to provide a range of vanadium content. In the chemical analysis method the sample was burned, and the vanadium in the ash was determined colorimetrically with diphenylbenzidine. The thermal neutrons were monitored by the method of the invention with 0.05 weight percent silver in the polyethylene sample container. The X-ray method used the method of additions by X-ray fluorescence. The fast neutron method used an associated particle monitor wherein a helium atom was produced for every neutron produced. The helium atoms were counted as a measure of the neutron flux $-T(d,n)He^4$. The results are tabulated as follows in weight parts per million of V based on sample weight.

| Run No. | Chemical | Fast (14 mev.) Neutrons | Thermal (6 mev.) Neutrons | X-ray |
|---------|----------|-------------------------|---------------------------|-------|
| 1 | 137 | 132 | 139 | 137 |
| 2 | 13.8 | 12.6 | 13.1 | 12.8 |
| 3 | 1.6 | 1.2 | 1.2 | 1.2 |

The results prove the reliability of the method of the invention as compared to conventional methods of activation and chemical analysis over a broad range of element concentration.

I claim:

1. A method for determining the content of a constituent in a substance by activation analysis comprising uniformly dispersing a known amount of a solid internal standard in at least the walls of a container molded of a thermoplastic organic polymer, so that the particles are each individually surrounded and held permanently in place by the walls in which they are dispersed and are thereby prevented from settling towards the bottom of the wall or from other physical rearrangement, placing a sample of said substance in said container, exposing said sample in said container to an activating flux of radiation selected from the group consisting of neutrons, charged particles and gamma rays for a period of time sufficient to excite the atoms in said element to a higher energy state, said known amount of internal standard providing a measure of the integrated flux to which the sample was exposed, removing the sample from the flux and measuring the amount of the characteristic radiation emitted by the radioactive nuclides resulting from the nuclear transformation of said constituent and determining the amount of the constituent present in the sample.

2. The method of claim 1 wherein said container is molded of polyethylene.

3. The method of claim 1 wherein said container is fabricated from a thermoplastic polymer of a 1-olefin.

4. The process of claim 1 wherein said substance comprises crude oil.

5. The process of claim 1 wherein said internal standard comprises silver.

References Cited

UNITED STATES PATENTS

| 2,952,775 | 6/1960 | Guinn | 250—43.5 |
| 3,009,062 | 11/1961 | Brooksbank | 250—83.1 |
| 3,094,621 | 6/1963 | Schultz | 250—106 |

RALPH G. NILSON, *Primary Examiner.*

S. ELBAUM, *Assistant Examiner.*